US011714697B2

(12) United States Patent
Zhu et al.

(10) Patent No.: US 11,714,697 B2
(45) Date of Patent: *Aug. 1, 2023

(54) RESET AND REPLAY OF MEMORY SUB-SYSTEM CONTROLLER IN A MEMORY SUB-SYSTEM

(71) Applicant: Micron Technology, Inc., Boise, ID (US)

(72) Inventors: Jiangli Zhu, San Jose, CA (US); Ying Yu Tai, Mountain View, CA (US); Fangfang Zhu, San Jose, CA (US); Wei Wang, Dublin, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,091

(22) Filed: Nov. 19, 2021

(65) Prior Publication Data

US 2022/0075682 A1    Mar. 10, 2022

Related U.S. Application Data

(63) Continuation of application No. 16/784,966, filed on Feb. 7, 2020.
(Continued)

(51) Int. Cl.
*G06F 11/00* (2006.01)
*G06F 11/07* (2006.01)
(Continued)

(52) U.S. Cl.
CPC ...... *G06F 11/0772* (2013.01); *G06F 9/30101* (2013.01); *G06F 9/544* (2013.01);
(Continued)

(58) Field of Classification Search
CPC ............... G06F 11/0772; G06F 11/076; G06F 11/1441; G06F 11/1068; G06F 11/1438
See application file for complete search history.

(56) References Cited

U.S. PATENT DOCUMENTS

| 5,896,204 A | * | 4/1999 | Sato ................... H04N 1/32619 358/437 |
| 6,782,492 B1 | * | 8/2004 | Nakaso ............... G06F 11/0709 714/48 |

(Continued)

FOREIGN PATENT DOCUMENTS

| CN | 101110047 | 1/2008 |
| CN | 102402396 | 4/2012 |

(Continued)

OTHER PUBLICATIONS

"International Application Serial No. PCT US2020 040557, International Preliminary Report on Patentability dated Jan. 27, 2022", 5 pages.

(Continued)

*Primary Examiner* — Amine Riad
(74) *Attorney, Agent, or Firm* — Schwegman Lundberg & Woessner, P.A.

(57) ABSTRACT

In an embodiment, a system includes a plurality of memory components and a processing device that is operatively coupled with the plurality of memory components. The processing device includes a host interface, an access management component, a media management component (MMC), and an MMC-restart manager that is configured to perform operations including detecting a triggering event for restarting the MMC, and responsively performing MMC-restart operations that include suspending operation of the access management component; determining whether the MMC is operating, and if so then suspending operation of (Continued)

the MMC; resetting the MMC; resuming operation of the MMC; and resuming operation of the access management component.

20 Claims, 6 Drawing Sheets

Related U.S. Application Data (60) Provisional application No. 62/874,359, filed on Jul. 15, 2019.

(51) Int. Cl.
*G06F 11/10* (2006.01)
*G06F 9/30* (2018.01)
*G06F 11/14* (2006.01)
*G06F 11/30* (2006.01)
*G06F 9/54* (2006.01)

(52) U.S. Cl.
CPC .......... *G06F 11/073* (2013.01); *G06F 11/076* (2013.01); *G06F 11/1044* (2013.01); *G06F 11/1068* (2013.01); *G06F 11/1441* (2013.01); *G06F 11/3037* (2013.01)

(56) References Cited

U.S. PATENT DOCUMENTS

| | | | | |
|---|---|---|---|---|
| 7,783,934 B2* | 8/2010 | Keays | ................... | G11C 16/10 714/42 |
| 10,725,845 B2* | 7/2020 | Lee | ..................... | G06F 12/0638 |
| 2006/0083059 A1* | 4/2006 | Matsuura | ........... | G11C 16/3477 365/185.01 |
| 2010/0211824 A1* | 8/2010 | Agrawal | ............. | G06F 11/0793 711/E12.008 |
| 2014/0281263 A1* | 9/2014 | Deming | .............. | G06F 12/1027 711/135 |
| 2018/0081543 A1* | 3/2018 | Muchherla | .............. | G06F 3/064 |
| 2021/0019217 A1 | 1/2021 | Zhu et al. | | |

FOREIGN PATENT DOCUMENTS

| | | |
|---|---|---|
| CN | 104572198 | 4/2015 |
| CN | 114341811 | 4/2022 |
| EP | 3825855 A1 | 5/2021 |
| JP | 2001022713 A | 1/2001 |
| JP | 2011180770 | 9/2011 |
| KR | 20080025503 A | 3/2008 |
| WO | WO-2021011201 A1 | 1/2021 |

OTHER PUBLICATIONS

"Chinese Application Serial No. 202080058877.X, Office Action dated Sep. 26, 2022", with English translation, 12 pages.
"International Application Serial No. PCT/US2020/040557, International Search Report dated Oct. 13, 2020", 3 pgs.
"International Application Serial No. PCT/US2020/040557, Written Opinion dated Oct. 13, 2020", 3 pgs.

* cited by examiner

RESET AND REPLAY OF MEMORY SUB-SYSTEM CONTROLLER IN A MEMORY SUB-SYSTEM

CROSS-REFERENCE TO RELATED APPLICATIONS

This application is a continuation of U.S. patent application Ser. No. 16/784,966, filed Feb. 7, 2020, which claims the benefit of U.S. Provisional Patent Application Ser. No. 62/874,359, filed Jul. 15, 2019 and entitled "Reset and Replay of a Memory Sub-System Controller in a Memory Sub-System," the entirety of each of which is hereby incorporated herein by reference.

TECHNICAL FIELD

Embodiments of the disclosure relate generally to memory sub-systems and more specifically to reset and replay of a memory sub-system controller in a memory sub-system.

BACKGROUND

A memory sub-system can be a storage device, a memory module, or a hybrid of a storage device and a memory module. The memory sub-system can include one or more memory components that store data. The memory components can be, as examples, non-volatile memory components and/or volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Implementations of the present disclosure are directed to reset and replay of a memory sub-system controller in a memory sub-system. A memory sub-system can be a storage device, a memory module, or a hybrid of a storage device and a memory module. Examples of storage devices and memory modules are described below in connection with FIG. 1. In general, a host system can utilize a memory sub-system that includes one or more memory components (also referred to herein as "memory devices"). The host system can provide data to be stored at the memory sub-system and can request data to be retrieved from the memory sub-system.

The host system can send access requests to the memory sub-system, such as to store data at the memory sub-system and to read data from the memory sub-system. The data to be read and written are hereinafter referred to as "user data". A host request can include a logical address (e.g., logical block address (LBA)) for the user data, which is the location the host system associates with the user data. The logical address (e.g., LBA) can be part of metadata for the user data.

A data path refers to the logical course or path that user data and metadata follow as they move throughout the memory sub-system. The data path in the memory sub-system handles read and write data commands received from the host system. The data path encompasses the complete, end-to-end course taken by data as it is either written to or read from the underlying memory devices.

A control path refers to the logical course or path that provides different control signals, for example, to components on the data path to control how the data path works properly. The control path and data path include digital circuitry, registers, and interconnecting buses.

Operational errors, system failures, and/or the like occur from time to time with respect to memory sub-systems. It can be evident from the perspective of a host system that an event such as this has occurred in connection with a memory sub-system if the memory sub-system reports the occurrence of an error, an exception, an assertion, a condition (e.g., high temperature), and/or the like to the host system, or if the memory sub-system fails to meet one or more performance metrics. In some cases, a host system can become aware of a problem with a memory sub-system when the host system receives a hardware interrupt from the memory-sub-system. In other instances, a host system may become aware of a problem with a memory sub-system if the memory sub-system becomes unresponsive, goes offline, becomes disabled, and/or the like.

In some cases, a host system may attempt to restart a memory sub-system, perhaps after expiration of a timeout period during which the host system was waiting for the memory sub-system to respond. Moreover, if a host system has to restart a memory sub-system more than a threshold number of times—or, perhaps, more than a threshold number of times within a certain amount of time, as examples, the host system may consider the memory sub-system to be unreliable, defective, and/or the like. In such instances, the host system may disable and/or discontinue use of the memory sub-system, as examples.

Implementations of the present disclosure address the above and other deficiencies with reset and/or replay of a memory sub-system controller in a memory sub-system. In accordance with at least one implementation, a memory sub-system controller of a memory sub-system includes a media-management-component restart (MMC-restart) manager, which in various different embodiments could be implemented in any combination of firmware, software, and hardware. The hardware can be part of the memory sub-system controller. The hardware can include a digital circuitry with dedicated (i.e., hard-coded) logic to perform the operations described herein. In some embodiments that are described herein, the MMC-restart manager is implemented in firmware. Functionally, in at least some implementations, the MMC-restart manager detects what is referred to herein as a triggering event for restarting a functional component of the memory sub-system controller that is known as the media management component. These triggering events are also referred to herein at times as MMC-restart triggering events, or simply as triggers.

In various different implementations, the triggers can take various forms. In some cases, one or more of the triggers involves notification of a problem (e.g., an error) by a component of the memory sub-system controller such as the media management component or another component known as the access management component, which resides between the host interface and the media management component, and performs operations including queueing commands and buffering data both from the host device to the media management component and vice versa, detecting a lack of communication with, e.g., the media management component for more than a predetermined amount of time. Other example triggers are described throughout the present disclosure.

In response to detecting one or more triggers, in at least some implementations of the present disclosure, the MMC-restart manager performs a set of operations that are referred to herein at times as MMC-restart operations. In some implementations, the MMC-restart operations include operations that individually and/or collectively suspend the memory sub-system serving the host device (e.g., receiving submitted commands from the host device, returning completed commands to the host device, receiving write data from the host device and writing that data to one or more of the memory devices of the memory sub-system, returning requested data that is read from one or more of the memory devices to the host device, and/or the like). In at least some instances, upon completion of the MMC-restart operations, the memory sub-system resumes serving the host device.

The MMC-restart operations could include operations such as suspending operation of the access management component; resetting the media management component; determining whether the media management component is operating, and if so then suspending operation of the media management component; resuming operation of the media management component; and resuming operation of the access management component. In some instances, the MMC-restart operations also include resetting and restarting one or more operations that are pending in the access management component; in some such cases, the MMC-restart operations also include reordering pending operations in the access management component. Further details regarding these example MMC-restart operations are given throughout this disclosure, and other example MMC-restart operations are described as well.

Among the benefits of implementations of the present disclosure is that a memory sub-system self recovers from internal problems, perhaps without an associated host device detecting that a problem (e.g., a delay) had occurred. Moreover, whether or not the host device had detected that a problem had occurred in connection with the memory sub-system, implementations of the present disclosure prevent the host device from having to reset the memory sub-system in order to continue operation. Additionally, to the extent the host device keeps count of such occurrences, the memory sub-system being able to prevent such occurrences keeps such a count from increasing. Thus, the host device is less likely to consider the memory sub-system to be problematic, defective, and/or the like, and is less likely to take measures such as disabling and/or discontinuing use of the memory sub-system. Other benefits will be evident to those of skill in the relevant art having the benefit of this disclosure.

Figure 1:
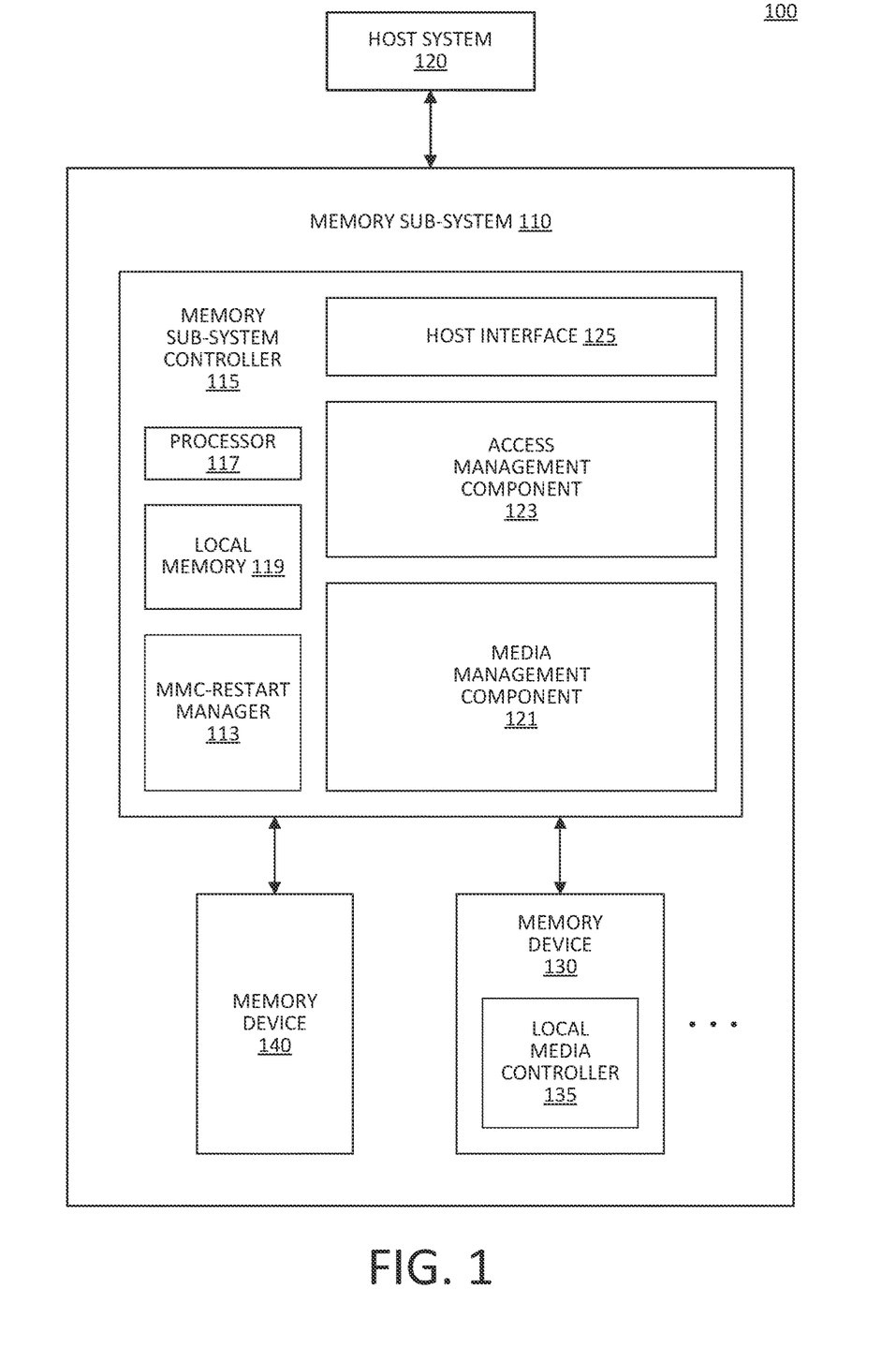
FIG. 1 is a block diagram of an example computing environment that includes a host device and a memory sub-system, the memory sub-system including a memory sub-system controller and a plurality of memory devices, in accordance with some embodiments of the present disclosure.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device(s) 130), or a combination of such.

A memory sub-system 110 can be a storage device, a memory module, or a hybrid of a storage device and a memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates an example of the host system 120 coupled to one memory sub-system 110. The host system 120 uses the memory sub-system 110, for example, to write user data to the memory sub-system 110 and read user data from the memory sub-system 110. As used herein. "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data (e.g., user data) between the host system 120 and the memory sub-system 110. The host system 120 can further utilize a non-volatile memory express (NVMe) interface to access the memory components (e.g., the memory devices 130) when the memory sub-system 110 is coupled with the host system 120 by a PCIe interface. The physical host interface can provide an interface for passing control, address, user data, and other signals between the memory sub-system 110 and the host system 120.

The memory devices can include any combination of the different types of volatile memory devices and/or non-volatile memory devices. The volatile memory devices (e.g., memory device 140) can be, but are not limited to, RAM, such as DRAM and synchronous DRAM (SDRAM).

An example of non-volatile memory devices (e.g., the memory device 130) includes three-dimensional (3D) cross-point ("3D cross-point") type flash memory, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type memory are described, the memory device 130 can be based on any other type of non-volatile memory, such as negative-and (NAND), read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

In some embodiments, each of the memory devices 130 can include one or more arrays of memory cells such as single level cells (SLCs), multi-level cells (MLCs), triple level cells (TLCs), quad-level cells (QLCs), or a combination of such. In some embodiments, a particular memory component can include an SLC portion and/or an MLC portion (e.g., a TLC portion or a QLC portion) of memory cells. Each of the memory cells can store one or more bits of data used by the host system 120. Furthermore, the memory cells of the memory devices 130 can be grouped as memory pages or memory blocks that can refer to a unit of the memory component used to store data.

The memory sub-system controller 115 can communicate with the memory devices 130 to perform operations such as reading data, writing data, or erasing data at the memory devices 130, and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or another suitable processor.

Furthermore, in some implementations, the memory sub-system controller 115 includes a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 includes memory registers storing memory pointers, fetched data, etc. The local memory 119 can also include ROM for storing microcode. While the example memory sub-system 110 in FIG. 1 is illustrated as including the memory sub-system controller 115, in another embodiment of the present disclosure, a memory sub-system 110 may not include a memory sub-system controller, and may instead rely upon external control (provided, by e.g., an external host or a processor or controller separate from the memory sub-system 110).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear-leveling operations, garbage-collection operations, error-detection and error-correcting-code (ECC) operations, encryption operations, caching operations, and address translations between a logical address (e.g., logical block address (LBA)) and a physical address that are associated with the memory devices 130. The memory sub-system controller 115 can further include a host interface 125 to communicate with the host system 120 via the physical host interface. The host interface 125 can convert the commands received from the host system 120 into command instructions to access the memory devices 130, as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the media device 130 (e.g., perform media management operations on the media device 130). In some embodiments, the memory devices 130 can be locally managed memory devices, which is a raw memory device combined with a local media controller 135 that performs memory management operations on the memory device 130 within the same memory device package.

The memory sub-system controller 115 can include a media management component 121 that interfaces between the memory sub-system controller 115 and the memory devices 130. Additionally, the memory sub-system controller 115 can include access management component 123, which interfaces between the host interface 125 and the media management component 121. In As described above, in at least one implementation of the present disclosure, among other functions, the access management component 123 provides queueing of commands and buffering of data in both directions between the host device 120 and the media management component 121. Within the memory sub-system controller 115, these functions of the access management component 123 take the form of the access management component 123 providing queueing of commands and buffering of data in both directions between the host interface 125 and the media management component 121, as described more fully below in connection with FIG. 2.

In at least one implementation of the present disclosure, and as is also depicted in FIG. 1, the memory sub-system controller 115 can also include an MMC-restart manager 113. In various different implementations, the MMC-restart manager 113 can take the form of or include circuitry, dedicated logic, programmable logic, firmware, software, and/or the like for performing at least the MMC-restart operations described herein. As mentioned above, by way of example and not limitation, the MMC-restart manager 113 is primarily described herein as being implemented in firmware.

In some instances, the memory sub-system controller 115 includes at least a portion of the MMC-restart manager 113—the processor 117 can be configured to execute instructions stored in the local memory 119 for performing one or more of the MMC-restart operations described herein. In some embodiments, the MMC-restart manager 113 is part of the host system 120, an application, or an operating system. Various functions that are performed by the MMC-restart manager 113 in different combinations in different embodiments are described throughout this disclosure, as are example communications among entities such as the host system 120, the host interface 125, the access management component 123, the media management component 121, and the MMC-restart manager 113.

Figure 2:
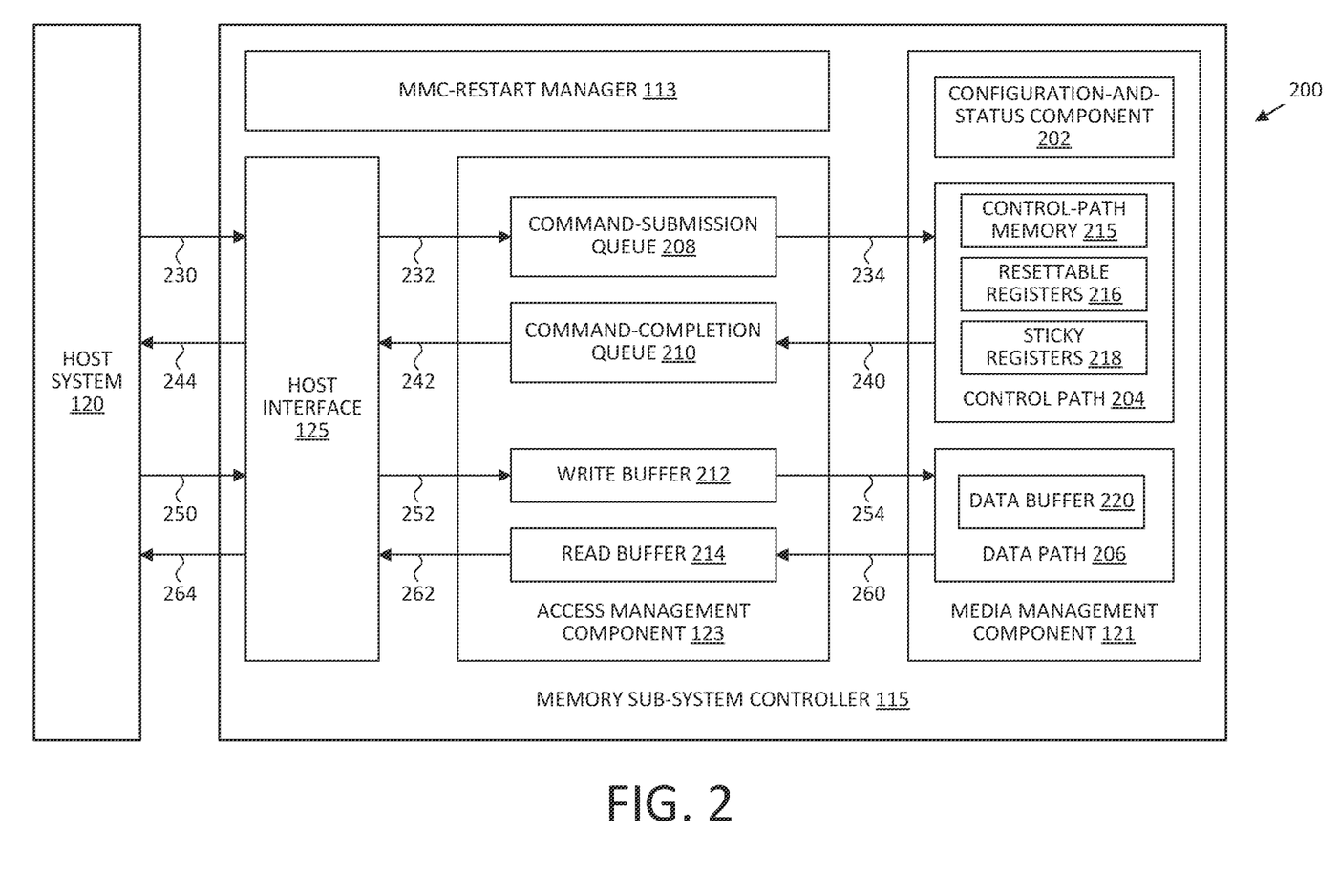
FIG. 2 is a block diagram of an example media management component of the memory sub-system controller of FIG. 1 in accordance with some embodiments of the present disclosure.

FIG. 2 depicts an example system architecture 200 in accordance with some embodiments of the present disclosure. The architecture 200 is provided by way of example and not limitation. In addition to the memory sub-system controller 115, also depicted in FIG. 2 is the host system 120. Any of the components of the memory sub-system controller 115 that are depicted in FIG. 2, or any of the sub-components thereof, can be realized using software and/or firmware executing on hardware, or as hardware circuits. As one example, one or more of the components or sub-components could be realized as programmed sections of an FPGA.

Moreover, some components of the memory sub-system controller 115 that are depicted in FIG. 1 are not depicted in FIG. 2: the processor 117 and the local memory 119. Also not depicted in FIG. 2 are connections or communications between the memory sub-system controller 115 and the memory devices 130 (e.g., between the media management component 121 and the memory devices 130). These omissions are not to imply that such components and connections are not present in at least some implementations, but rather are intended to more clearly present the entities, components, connections, communications, and the like that are depicted in FIG. 2. The media management component 121 includes various hardware sub-components that includes digital circuitry with dedicated (i.e., hard-coded) logic to perform the operations of the components described herein.

The media management component can include digital and analog circuitry to define a control path and a data path or portions of a control path and a data path. A data path refers to the logical course or path that user data and metadata follow as they move throughout the memory sub-system. The data path in the memory sub-system handles read and write data commands received from the host system. The data path encompasses the complete, end-to-end course taken by data as it is either written to or read from the underlying memory devices. A control path refers to the logical course or path that provides different control signals, for example, to components on the data path to control how the data path works properly. The control path and data path include digital circuitry, registers, and interconnecting buses.

The media management component 121 is depicted in the architecture 200 of FIG. 2 as including a configuration-and-status circuit 202, a control path 204, and a data path 206. The configuration-and-status circuit 202 can receive configuration and status requests from, and can transmit configuration and status responses to, the processor 117. The configuration and status requests could relate to the processor 117 configuring various operational parameters of the media management component 121, and could also relate to the processor 117 requesting status information regarding the media management component 121. The configuration and status responses could include responses to those status requests, as well as confirmation (or failure) responses regarding any received configuration requests.

The control path 204 is depicted in FIG. 2 as including control-path memory 215, resettable registers 216, and sticky registers 218.

Although not pictured in FIG. 2, the control path 204 could also include sequential control-path stages for performing operations such as parsing commands, processing commands, and completing commands. With respect to completing commands, this can include the control path 204 formulating responses to commands, indicating success or failure with respect to execution of the commands, and transmitting those responses to the access management component 123 for intended receipt by the host system 120.

The control-path memory 215 could be static RAM (SRAM) as one example, and could be used by the data path 206 to store any data used by the data path 206 during operation.

In at least one implementation of the present disclosure, the resettable registers 216 include one or more registers that, when the media management component 121 undergoes a reset operation, have any values stored therein cleared. Moreover, in at least one implementation, the sticky registers 218 include one or more registers that, when the media management component 121 undergoes a reset operation, do not have any values stored therein cleared-rather, any values stored in one or more of the sticky registers 218 persist through a reset of the media management component 121. In at least one implementation, any values stored in either or both of the resettable registers 216 and the sticky registers 218 do not persist through a power cycle of the media management component 121, which could occur as part of a power cycle of the memory sub-system controller 115, as an example.

As a general matter, the data path 206 may function to execute some commands (e.g., data requests such as write requests, read requests, and/or the like) that originate at the host system 120, including executing those data requests vis-A-vis the memory devices 130. In the example architecture 200 that is depicted in FIG. 2, the data path 206 is shown as including a data buffer 220. In the case of write requests, the data path 206 may buffer write-data segments, which contain data from the host system 120 that is to be written to one or more of the memory devices 130, in the data buffer 220 prior to writing those write-data segments to one or more of the memory devices 130. In the case of read requests, the data path 206 may buffer read-data segments, which contain data that has been read from one or more of the memory devices 130 at the request of the host system 120, prior to transmitting those read-data segments to the access management component 123 for intended receipt by the host system 120. In some implementations, the data buffer 220 is a single buffer, in other implementations, the data buffer 220 includes multiple data buffers (e.g., a write-data buffer and a read-data buffer).

As depicted in FIG. 2, the access management component 123 includes a command-submission queue 208, a command-completion queue 210, a write buffer 212, and a read buffer 214, each of which may be arranged to operate in a first-in-first-out (FIFO) manner, though other implementations could be selected instead for one or more of these queues and/or buffers. Both the command-submission queue 208 and the command-completion queue 210 are arranged in at least one implementation to function as queues for commands between the host interface 125 and the media management component 121. Furthermore, both the write buffer 212 and the read buffer 214 are arranged in at least one implementation to function as buffers for data segments (e.g., blocks, pages, packets, frames, and/or any other suitable quantities of data) in between the host interface 125 and the media management component 121.

In operation, in at least one implementation of the present disclosure, the host interface 125 receives, from the host system 120, submitted host commands 230, which could include write commands, read commands, erase commands, reset commands, power-cycle commands, and/or any other type of commands that the host system 120 may transmit to the memory sub-system 110. The host interface 125 can convert the submitted host commands 230 into submitted host-interface commands 232. In some implementations, this conversion involves the host interface 125 reformatting the submitted host commands 230 into the submitted host-interface commands 232, which may be in a format suitable for internal processing by the memory sub-system controller 115. The host interface 125 transmits the submitted host-interface commands 232 to the command-submission queue 208. When the submitted host-interface commands 232 emerge from the command-submission queue 208, they are referred to herein as submitted access management component commands 234, which are transmitted from the command-submission queue 208 to the control path 204.

As can be seen in the preceding paragraph, the convention used in this description for the various commands, write-data segments, and read-data segments that are depicted in and described in connection with FIG. 2 is to name the commands, write-data segments, and read-data segments according to which entity is generating (or at least transmitting) them. Continuing this description, then, it can be seen that the control path 204 transmits completed MMC commands 240 to the command-completion queue 210. When the completed MMC commands 240 emerge from the command-completion queue 210, they are referred to herein as completed access-management-component commands 242, which are transmitted from the command-completion queue 210 to the host interface 125. In at least one implementation, the host interface 125 converts the completed access-management-component commands 242 into a format that is suitable for transmission to and processing by the host system 120. Those converted and transmitted commands are referred to herein as completed host-interface commands 244.

Moreover, the host interface 125 receives host write-data segments 250 from the host system 120. The host write-data segments 250 include data that the host system 120 is requesting be written to one or more of the memory devices 130. The host interface 125 receives the host write-data segments 250, converts them into a format that is suitable for internal processing by the memory sub-system 110, and transmits the converted write-data segments to the write buffer 212 as host-interface write-data segments 252. When the host-interface write-data segments 252 emerge from the write buffer 212, they are referred to herein as access-management-component write-data segments 254, which are transmitted from the write buffer 212 of the access management component 123 to the data path 206. The access-management-component write-data segments 254 may then be buffered in the data buffer 220 prior to being written to one or more of the memory devices 130.

In the other direction, as described above, the data path 206 may use the data buffer 220 to buffer read-data segments that have been read from one or more of the memory devices 130. When they emerge from the data buffer 220 and are transmitted by the data path 206 to the read buffer 214 of the access management component 123, these read-data segments are referred to herein as the MMC read-data segments 260. And when the MMC read-data segments 260 emerge from the read buffer 214, they are referred to herein as the access-management-component read-data segments 262, which are transmitted from the read buffer 214 of the access management component 123 to the host interface 125. In at least one implementation, the host interface 125 converts the access-management-component read-data segments 262 into a format that is suitable for transmission to and processing by the host system 120. These converted and transmitted read-data segments are referred to herein as the host-interface read-data segments 264.

Figure 3:
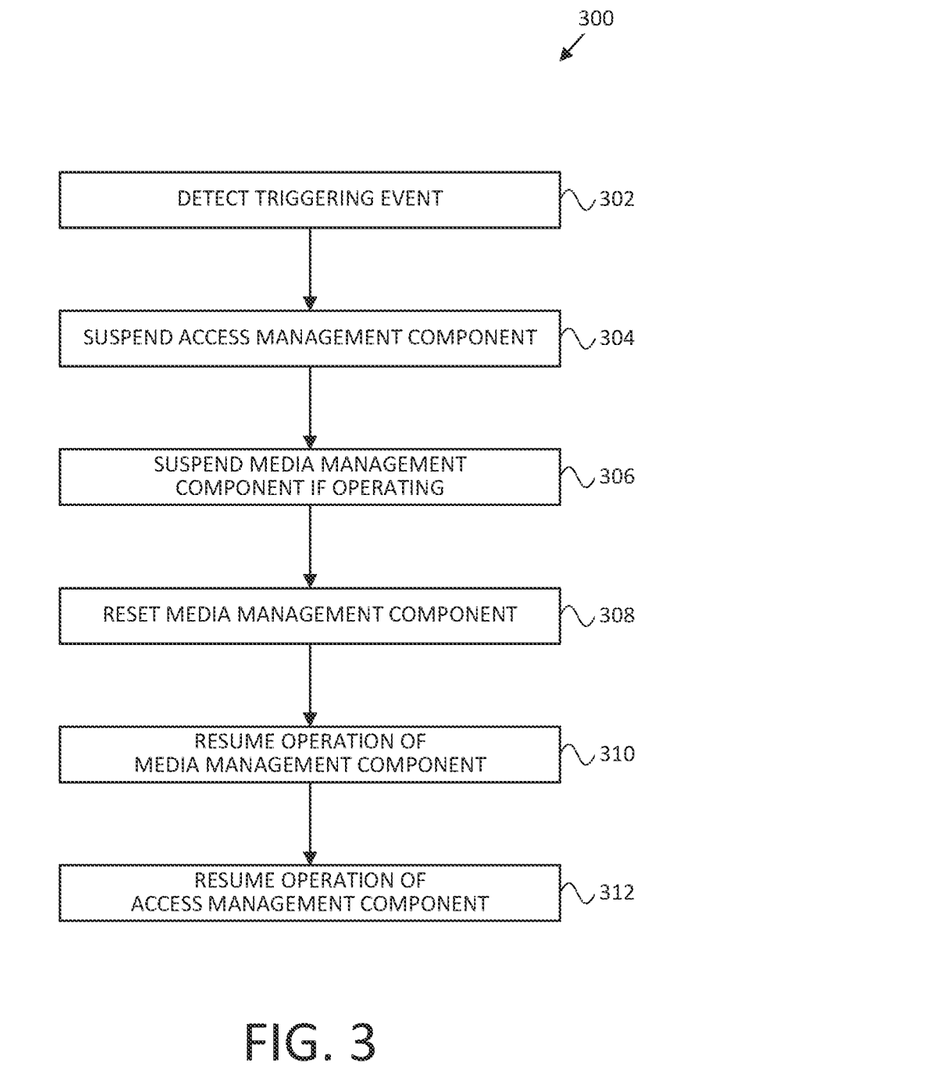
FIG. 3 is a flow diagram of an example method for reset and replay of a memory sub-system controller in a memory sub-system that can be performed by the memory sub-system controller of FIG. 1 in accordance with some embodiments of the present disclosure.

FIG. 3 is a flow diagram of an example method 300 for reset and replay of a memory sub-system controller in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the restart manager 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

At operation 302, the processing device detects a triggering event, such as an error. Examples of errors include, and are not limited to, errors at a media management component of the memory sub-system controller, errors related to one or more of the memory devices 130, uncorrectable data errors pertaining to attempts to read data from one or more of the memory devices 130, and detecting at least a threshold drop in a throughput level of the memory sub-system or one or more components of the memory sub-system. Errors at the media management component of the memory sub-system can include internal errors such as internal logic errors, errors related to changes in voltage and/or frequency, and errors that occur in SRAM and/or registers, as well as logic design errors.

The processing device can detect an error by receiving a signal. The signal can be received, for example, as an interrupt signal. The interrupt signal can be received from firmware being executed, for example, by the processing device.

At operation 304, the processing device prevents receiving any incoming commands from a host interface (e.g., the host interface 125). A memory sub-system can receive host commands from a host system via a host interface. The processing device can receive commands from the host interface. The processing device can suspend acceptance of host interface command traffic from the host interface. Two examples of host-interface traffic—that the access management component 123 could be suspended from accepting—are the submitted host-interface commands 232 and the host-interface write-data segments 252.

At operation 306, the processing device determines whether a media management component of the memory sub-system controller is active. The determination can be based, for example, on whether or not the media management component is performing operations or particular operations (e.g., processing incoming commands). If the media management component is active, the processing device suspends operation of the media management component, for example by suspending acceptance by the media management component of incoming command traffic (e.g., access-management-component traffic). Some examples of access-management-component traffic—that the media management component 121 could be suspended from accepting—are the submitted access-management-component commands 234 and the access-management-component write-data segments 254.

At operation 308, the processing device resets the media management component. As described herein, in some implementations, the media management component 121 includes the control path 204, which includes the control-path memory 215 and the one or more resettable registers 216, as well as the data path 206, which includes the data buffer 220. In some instances of performing the operation 308, the MMC-restart manager 113 clears the control-path memory 215, clears the resettable registers 216, and clears the data buffer 220. It is noted that "clearing" in this context can also be referred to as "cleaning."

Another example MMC-restart operation is shown at operation 310, which involves the MMC-restart manager 113 resuming operation of the media management component 121. In some instances, this can involve the MMC-restart manager 113 and/or another entity in the memory sub-system controller 115 sending the media management component 121 an instruction to resume operation, which could involve resuming the acceptance of access-management-component traffic from the access management component 123.

The MMC-restart operations could also include the MMC-restart manager 113 resuming operation of the access management component 123 (see operation 312). This could involve the MMC-restart manager 113 and/or another entity in the memory sub-system controller 115 sending the access management component 123 an instruction to resume operation, which could include resuming the acceptance of host-interface traffic from the host interface 125.

In some implementations of the present disclosure, after suspending operation of the access management component 123 (at operation 304) and prior to resuming operation of the access management component 123 (at operation 312), the MMC-restart manager 113 performs an additional set of MMC-restart operations that involves the MMC-restart manager 113 determining whether there are any pending commands in the access management component 123 (e.g., in the command-submission queue 208), and if so then resetting a state of, as well as restarting, each such pending command in the access management component 123. In some instances, restarting each pending command in the access management component 123 involves restarting a group of pending commands in the access management component 123 in the order in which they were queued in the command-submission queue 208 prior to the suspension of the access management component 123 (at operation 304). In other instances, however, the MMC-restart manager 113 reorders a group of pending commands that are queued in the command-submission queue 208 in the access management component 123 into a revised order, and then restarts that group of pending commands in that revised order.

Figure 4:
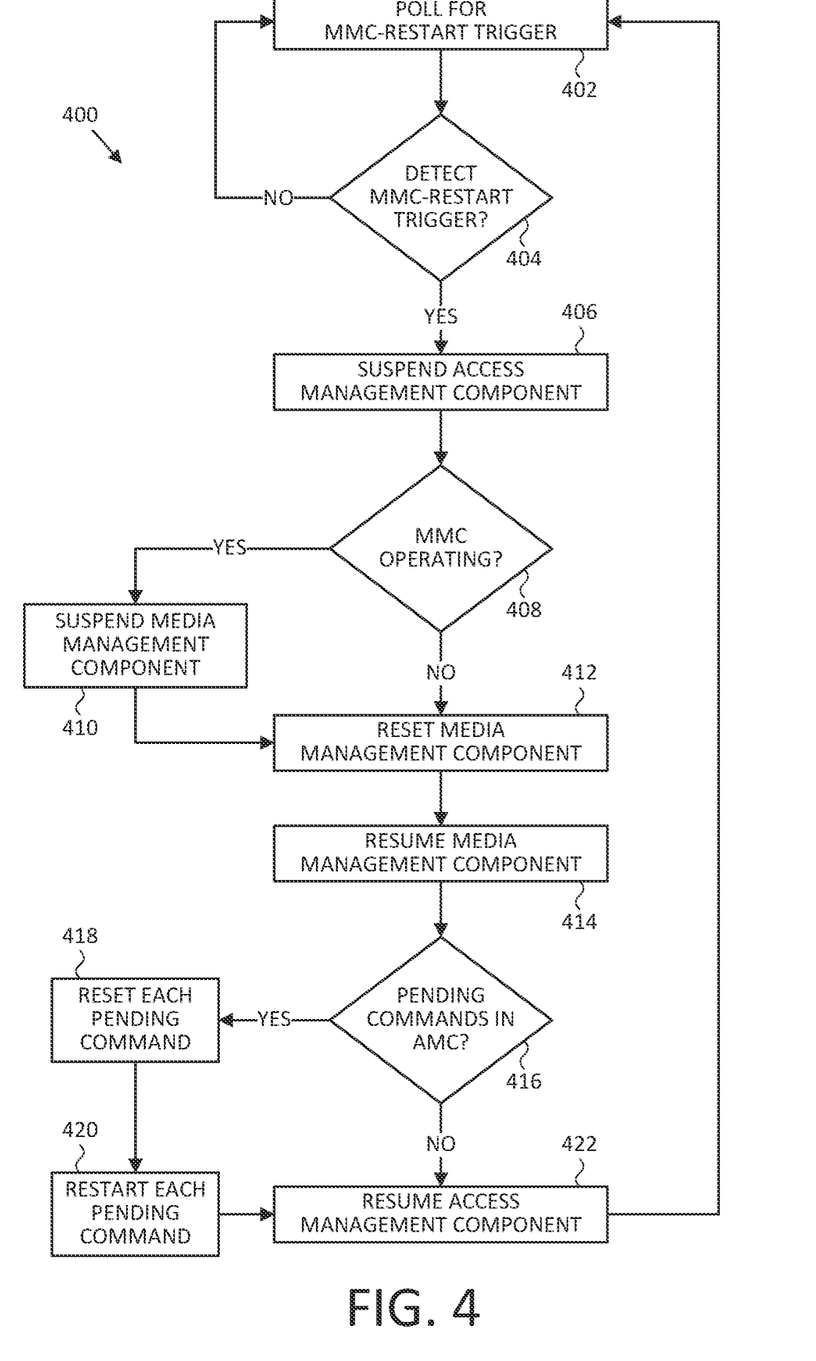
FIG. 4 is a flow diagram depicting example operations performed by the memory sub-system controller of FIG. 1 in accordance with some embodiments of the present disclosure.

FIG. 4 is a flow diagram of an example method 400 for reset and replay of a memory sub-system controller in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the restart manager 113 of FIG. 1. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment. Other operation flows are possible.

A number of the operations that are performed as part of the method 400 are similar to operations that are performed as part of the method 300, and therefore are not described in connection with the method 400 in as great of detail.

At operation 402, with the MMC-restart manager 113 polling (e.g., checking) for the occurrence of an MMC-restart trigger. Control then proceeds to operation 404, where the MMC-restart manager 113 evaluates whether or not it has in fact detected such a triggering event. If not, control returns to operation 402 and the MMC-restart manager 113 continues polling. If so, however, control proceeds to operation 406, where the MMC-restart manager 113 suspends the access management component 123.

Control then proceeds to the operation 408, at which the MMC-restart manager 113 determines whether or not the media management component 121 is currently operating. The MMC-restart manager 113 may make this determination based on an elapsed time since last receiving any communication from the media management component 121. In other cases, the MMC-restart manager 113 may make this determination by actively sending a ping message to the media management component 121 and awaiting a response. If a response is received within a certain amount of time, the MMC-restart manager 113 may determine that the media management component 121 is operating. If no such response is received within that predetermined amount of time, the MMC-restart manager 113 may determine that the media management component 121 is not operating.

If the MMC-restart manager 113 determines at operation 408 that the media management component 121 is operating, then control proceeds to operation 410, at which the MMC-restart manager 113 suspends the media management component 121. Control then proceeds from operation 410 to operation 412. If, instead, the MMC-restart manager 113 determines at operation 408 that the media management component 121 is not operating, then control proceeds directly from operation 408 to operation 412. Either way, at operation 412, the MMC-restart manager 113 resets the media management component 121. Control then proceeds to operation 414, at which the MMC-restart manager 113 resumes operation of the media management component 121.

Next, at operation 416, the MMC-restart manager 113 evaluates whether or not there are any pending commands in the access management component 123 (e.g., queued in the command-submission queue 208). If so, control proceeds to operation 418, at which the MMC-restart manager 113 resets each such pending command, and then to operation 420, at which the MMC-restart manager 113 restarts each such pending command. Control then proceeds to operation 422.

If, instead, the MMC-restart manager 113 determines at operation 416 that there are no pending commands in the access management component 123, control proceeds directly from operation 416 to operation 422. Either way, at operation 422, the MMC-restart manager 113 resumes operation of the access management component 123. Control then returns to operation 402, at which the MMC-restart manager 113 polls the occurrence of one or more MMC-restart triggers.

Figure 5:
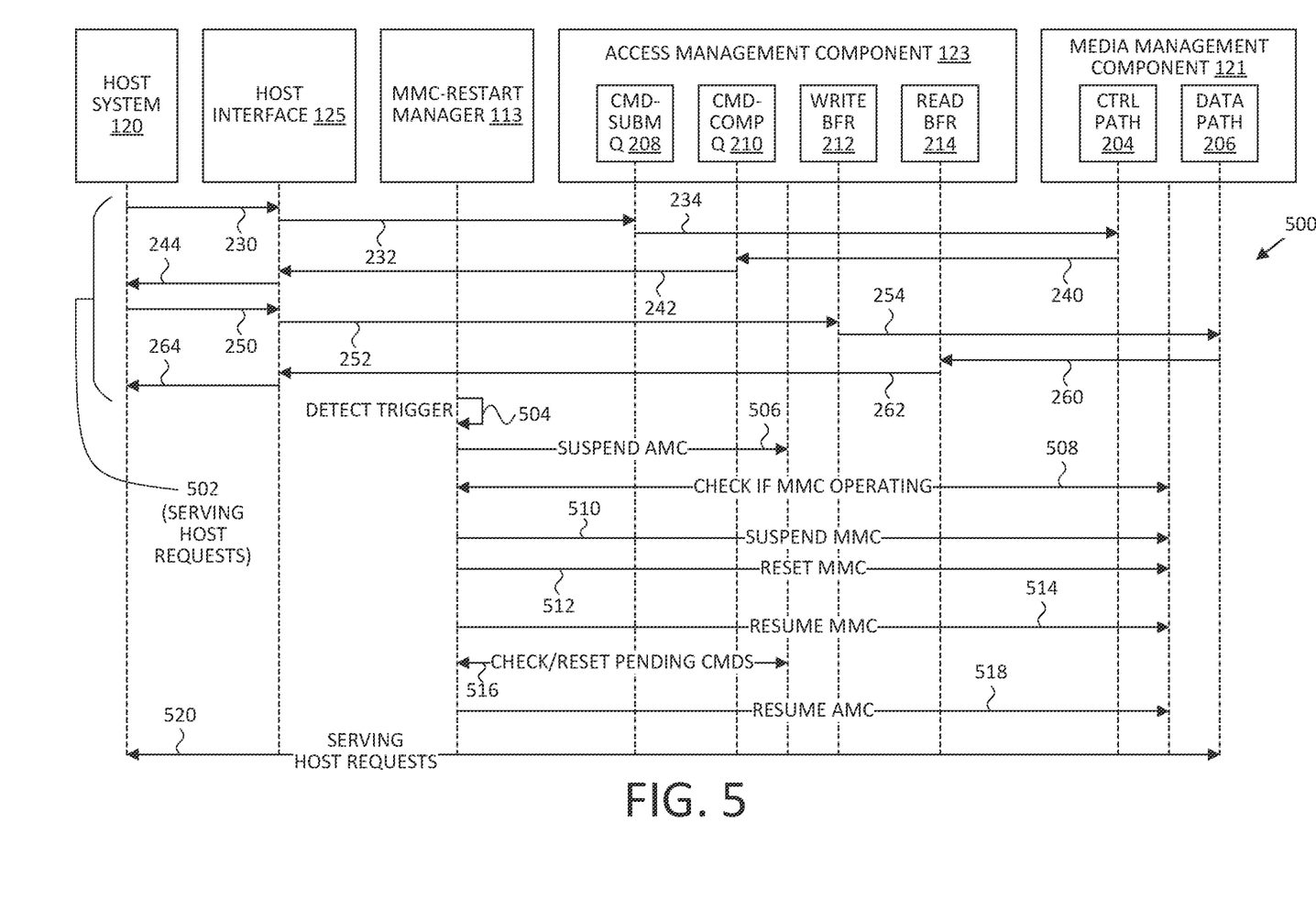
FIG. 5 is a message flow diagram depicting communications among the host device and various functional components of the memory sub-system controller of FIG. 1, as well as operations performed by the memory sub-system controller of FIG. 1, in accordance with some embodiments of the present disclosure.

A number of the communications and operations that are described herein are displayed in graphical form in an example message flow 500 that is depicted in and described here in connection with FIG. 5. As is the case with the method 400 of FIG. 4, these communications and operations are not described in connection with FIG. 5 in as great of detail as they are elsewhere in this disclosure. The message flow 500 does, however, provide additional visualizable understanding of at least some implementations of the present disclosure.

It can be seen that the entities that are represented in the message flow 500 are the host system 120, the host interface 125, the MMC-restart manager 113, the access management component 123 (including the command-submission queue 208, the command-completion queue 210, the write buffer 212, and the read buffer 214), and the media management component 121 (including the control path 204 and the data path 206). Moreover, it can be seen that, during an initial stage 502, the message flow 500 begins with normal operation as between the host system 120 and the memory sub-system 110. As part of this normal operation, the memory sub-system 110 is serving host requests from the host system 120.

In particular, it can be seen during the initial stage 502 that the host system 120 sends the submitted host commands 230 to the host interface 125, which in turn sends the submitted host-interface commands 232 to the command-submission queue 208. These commands emerge from the command-submission queue 208 as the submitted access-management-component commands 234, which are transmitted to the control path 204. Furthermore, the control path 204 sends the completed MMC commands 240 to the command-completion queue 210. The commands that emerge from the command-completion queue 210 are the completed access-management-component commands 242, which are transmitted by the command-completion queue 210 to the host interface 125, which in turn transmits the completed host-interface commands 244 to the host system 120.

Additionally, the host system 120 sends the host write-data segments 250 to the host interface 125, which in turn sends the host-interface write-data segments 252 to the write buffer 212. The write buffer 212 then sends the access-management-component write-data segments 254 to the data path 206. Moreover, the data path 206 sends the MMC read-data segments 260 to the read buffer 214, which in turn sends the access-management-component read-data segments 262 to the host interface 125. The host interface 125 then sends the host-interface read-data segments 264 to the host system 120.

In summary, then, it can be seen during the initial stage 502 that commands and data-segments are being exchanged between the host system 120 and the memory sub-system 110 (in that commands and data segments are being exchanged between the host system 120 and the host interface 125 of the memory sub-system controller 115, which is part of the memory sub-system 110). The depicted commands that are being exchanged are the submitted host commands 230 and the completed host-interface commands 244. The depicted data segments that are being exchanged are the host write-data segments 250 and the host-interface read-data segments 264.

Then, at operation 504, the MMC-restart manager 113 detects an MMC-restart trigger. Next, the MMC-restart manager 113 sends a command 506 to the access management component 123 to suspend the access management component 123. At operation 508, represented by a double-ended arrow, the MMC-restart manager 113 checks whether or not the media management component 121 is operating. In this example, the MMC-restart manager 113 determines at operation 508 that the media management component 121 is operating, and accordingly sends a command 510 to the media management component 121 to suspend the media management component 121. The MMC-restart manager 113 then sends a command 512 to the media management component 121 to reset the media management component 121, followed by a command 514 to the media management component 121 to instruct the media management component 121 to resume operation.

After sending the commands 510, 512, and 514, the MMC-restart manager 113 (at operation 516, also represented by a double-ended arrow) checks whether or not there are any pending commands in the access management component 123 (e.g., queued in the command-submission queue 208). In this example, there are some such pending commands, and operation 516 therefore also includes the MMC-restart manager 113 resetting and restarting (perhaps after reordering) those pending commands. Next, the MMC-restart manager 113 sends a command 518 to the media management component 121, instructing the media management component 121 to resume operation.

Finally, it can be seen in the message flow 500 that, at a post-restart stage 520, the memory sub-system 110 is again serving host requests with respect to the host system 120. This is represented in the message flow 500 by the double-ended, end-to-end arrow associated with the post-restart stage 520. Notably, while there is communication between the host system 120 and the memory sub-system 110 (and in particular the host interface 125) during the initial stage 502 and again during the post-restart stage 520, there is no communication between the host system 120 and the memory sub-system 110 in between the initial stage 502 and the post-restart stage 520. In at least some such example instances, however, the host system 120 did not need to act to, e.g., reset or restart the memory sub-system 110. Instead, in accordance with implementations of the present disclosure, the memory sub-system 110 detected and recovered from its own internal issue(s), problem(s), error(s), delay(s), and/or the like.

Moreover, for testing purposes, some implementations of the present disclosure include the disposition of one or more functional modules—that could be implemented using software and/or firmware executing on hardware, or perhaps be implemented as hardware components—in or in communication with the memory sub-system controller 115. Such functional modules could operate to intentionally "inject" errors at the media management component 121 in order to intentionally cause the MMC-restart manager 113 to detect one or more MMC-restart triggering events, so as to evaluate the performing of one or more of the herein-described MMC-restart operations. Metrics such as data integrity, the duration of time in which traffic between the host system 120 and the memory sub-system 110 is suspended, and/or the like could be evaluated using such an approach.

Figure 6:
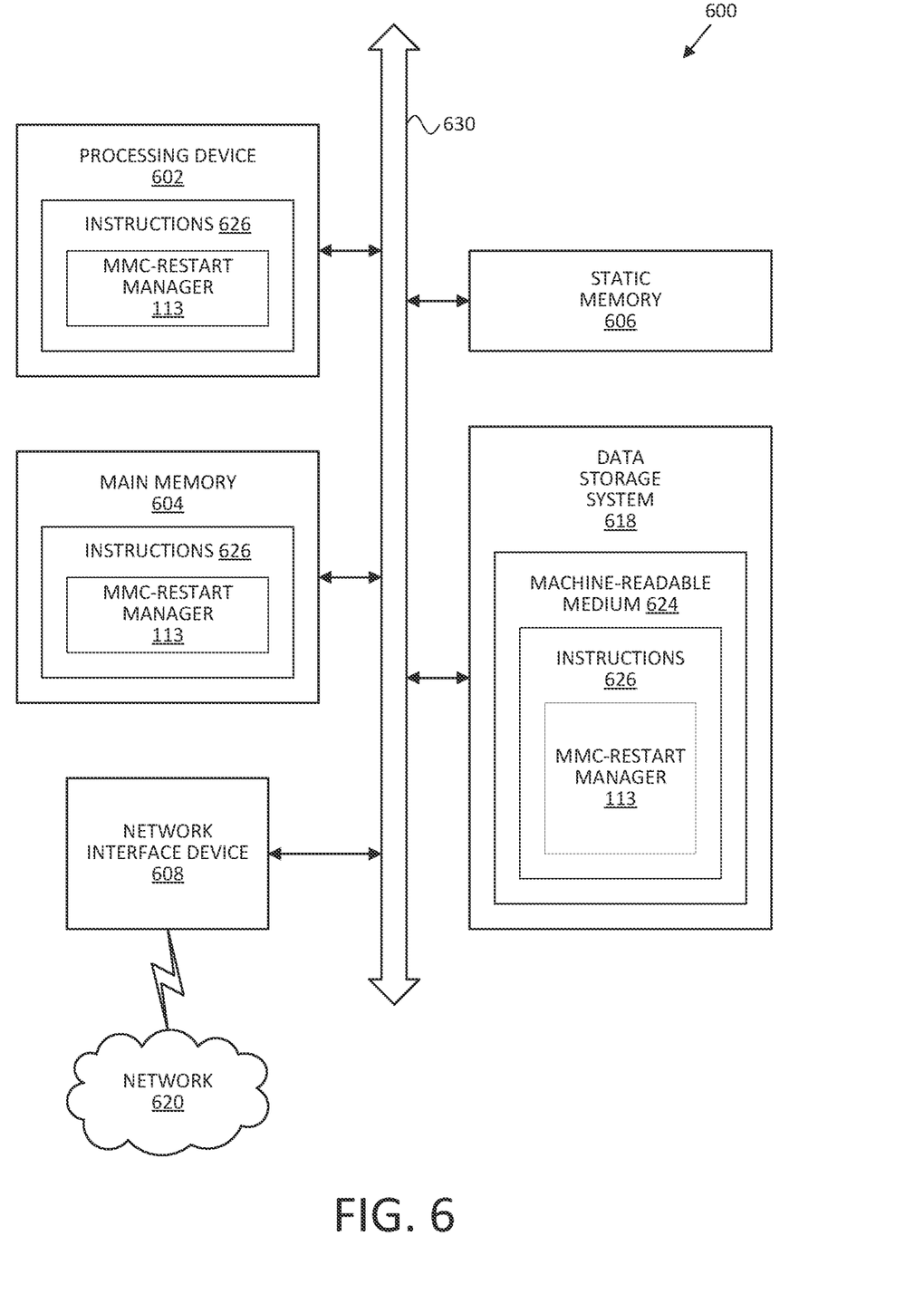
FIG. 6 is a block diagram of an example computer system in which embodiments of the present disclosure may operate.

FIG. 6 illustrates an example machine of a computer system 600 within which a set of instructions 626, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the MMC-restart manager 113 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or RDRAM, etc.), a static memory 606 (e.g., flash memory, SRAM, etc.), and a data storage system 618, which communicate with each other via a bus 630.

The processing device 602 represents one or more general-purpose processing devices such as a microprocessor, a central processing unit (CPU), or the like. More particularly, the processing device 602 can be a complex instruction set computing (CISC) microprocessor, a reduced instruction set computing (RISC) microprocessor, a very long instruction word (VLIW) microprocessor, or a processor implementing other instruction sets, or processors implementing a combination of instruction sets. The processing device 602 can also be one or more special-purpose processing devices such as an ASIC, an FPGA, a digital signal processor (DSP), a network processor, or the like. In at least one embodiment, the processing device 602 is configured to execute instructions 626 for performing the operations discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In an embodiment, the instructions 626 include instructions to implement functionality corresponding to an MMC-restart manager 113 (e.g., the MMC-restart manager 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" should also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed description have been presented in terms of algorithms and symbolic representations of operations on data bits within a computer memory. These algorithmic descriptions and representations are the ways that are used by those skilled in the data-processing arts to most effectively convey the substance of their work to others skilled in such arts. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and/or otherwise manipulated. It has proven convenient at times, principally for reasons of common usage, to refer to these signals as bits, values, elements, symbols, characters, terms, numbers, and/or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within a computer system's registers and memories into other data similarly represented as physical quantities within the computer system's registers and memories or other such information-storage systems.

The present disclosure also relates to an apparatus for performing the operations that are described herein. This apparatus can be specially constructed for the intended purposes, or it can include a general-purpose computer selectively activated or reconfigured by a computer program stored in the computer. Such a computer program can be stored in a computer-readable storage medium such as but not limited to any type of disk including floppy disks, optical disks, CD-ROMs, magnetic-optical disks. ROMs, RAMs, EPROMs. EEPROMs, magnetic or optical cards, and/or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the present disclosure. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic device or devices) to perform a process according to the present disclosure. A machine-readable medium includes any mechanism for storing information in a form readable by a machine (e.g., a computer). In some implementations, a machine-readable (e.g., computer-readable) medium includes a machine-readable (e.g., computer-readable) storage medium such as a ROM, RAM, magnetic disk storage media, optical storage media, flash memory devices, and/or the like.

In the foregoing specification, some example implementations of the disclosure have been described. It will be evident that various modifications can be made thereto without departing from the broader scope and spirit of the disclosure as set forth in the following claims. The specification and drawings are, accordingly, to be regarded in an illustrative sense rather than in a restrictive sense. Below is a non-exhaustive list of examples of implementations of the present disclosure.

Example 1 is a system that includes a plurality of memory components; and a processing device that is operatively coupled with the plurality of memory components, the processing device including a host interface, an access management component, a media management component, and an MMC-restart manager that is configured to perform operations including detecting a triggering event for restarting the media management component; and, responsive to detecting the triggering event, performing MMC-restart operations including suspending operation of the access management component; determining whether the media management component is operating, and if so then suspending operation of the media management component; resetting the media management component; resuming operation of the media management component; and resuming operation of the access management component.

Example 2 is the subject matter of Example 1, where the triggering event includes receipt of a notification from the media management component.

Example 3 is the subject matter Example 2, where the notification includes a notification of an internal error of the media management component.

Example 4 is the subject matter of either Example 2 or Example 3, where the notification includes a notification of an error related to one or more of the memory components in the plurality of memory components.

Example 5 is the subject matter of any of the Examples 1-4, where the triggering event includes receipt of a notification of an error from a firmware of the system.

Example 6 is the subject matter of any of the Examples 1-5, where the triggering event includes at least a threshold drop in a throughput level of the media management component.

Example 7 is the subject matter any of the Examples 1-6, where the triggering event includes one or more uncorrectable data errors.

Example 8 is the subject matter of any of the Examples 1-7, where suspending operation of the access management component includes suspending acceptance by the access management component of host-interface traffic from the host interface.

Example 9 is the subject matter of any of the Examples 1-8, where suspending operation of the media management component includes suspending acceptance by the media management component of access-management-component traffic from the access management component.

Example 10 is the subject matter of any of the Examples 1-9, where the media management component includes a control path that includes (i) control-path memory and one or more resettable registers and (ii) a data path that includes a data buffer, and resetting the media management component includes clearing the control-path memory; clearing the one or more resettable registers; and clearing the data buffer.

Example 11 is the subject matter of any of the Examples 1-10, the MMC-restart operations further including: after suspending operation of the access management component and prior to resuming operation of the access management component, determining whether there are any pending commands in the access management component, and if so then resetting a state of each pending command in the access management component; and restarting each pending command in the access management component.

Example 12 is the subject matter of Example 11, where restarting each pending command in the access management component includes restarting a plurality of pending commands in the access management component in an original order.

Example 13 is the subject matter of Example 11, where the MMC-restart operations further include reordering a plurality of pending commands in the access management component into a revised order, and where restarting each pending command in the access management component includes restarting the plurality of pending commands in the access management component in the revised order.

Example 14 is a method including detecting, by an MMC-restart manager of a processing device, a triggering event for restarting a media management component of the processing device, the processing device being operatively coupled with a plurality of memory components, the processing device further including a host interface and an access management component; and, responsive to detecting the triggering event, the MMC-restart manager performing MMC-restart operations including suspending operation of the access management component; determining whether the media management component is operating, and if so then suspending operation of the media management component; resetting the media management component; resuming operation of the media management component; and resuming operation of the access management component.

Example 15 is the subject matter of Example 14, where the triggering event includes receipt of a notification from the media management component.

Example 16 is the subject matter of either Example 14 or Example 15, where suspending operation of the access management component includes suspending acceptance by the access management component of host-interface traffic from the host interface.

Example 17 is the subject matter of any of the Examples 14-16, where suspending operation of the media management component includes suspending acceptance by the media management component of access-management-component traffic from the access management component.

Example 18 is the subject matter of any of the Examples 14-17, where the media management component includes (i) a control path that includes control-path memory and one or more resettable registers and (ii) a data path that includes a data buffer, and where resetting the media management component includes clearing the control-path memory; clearing the one or more resettable registers; and clearing the data buffer.

Example 19 is the subject matter of any of the Examples 14-18, where the MMC-restart operations further include: after suspending operation of the access management component and prior to resuming operation of the access management component, determining whether there are any pending commands in the access management component, and if so then resetting a state of each pending command in the access management component; and restarting each pending command in the access management component.

Example 20 is a non-transitory machine-readable storage medium containing instructions that, when executed by a processing device, cause the processing device to perform operations including detecting, by an MMC-restart manager of the processing device, a triggering event for restarting a media management component of the processing device, the processing device being operatively coupled with a plurality of memory components, the processing device further including a host interface and an access management component; and, responsive to detecting the triggering event, the MMC-restart manager performing MMC-restart operations including suspending operation of the access management component; determining whether the media management component is operating, and if so then suspending operation of the media management component; resetting the media management component; resuming operation of the media management component; and resuming operation of the access management component.

What is claimed is:

1. A system comprising:
a plurality of memory components; and
a processing device that is operatively coupled with the plurality of memory components and is configured to perform operations comprising:
responsive to detecting a triggering event for restarting a media management component, performing operations comprising:
suspending operation of an access management component;
determining whether the media management component is operating, and if so then suspending operation of the media management component;
resetting the media management component;
resuming operation of the media management component; and
resuming operation of the access management component.

2. The system of claim 1, wherein the triggering event comprises receipt of a notification from the media management component.

3. The system of claim 2, wherein the notification comprises a notification of an internal error of the media management component.

4. The system of claim 2, wherein the notification comprises a notification of an error related to one or more of the memory components in the plurality of memory components.

5. The system of claim 1, wherein the triggering event comprises receipt of a notification of an error from a firmware of the system.

6. The system of claim 1, wherein the triggering event comprises at least a threshold drop in a throughput level of the media management component.

7. The system of claim 1, wherein the triggering event comprises one or more uncorrectable data errors.

8. The system of claim 1, wherein suspending operation of the access management component comprises:
suspending acceptance by the access management component of host-interface traffic from the host interface.

9. The system of claim 1, wherein suspending operation of the media management component comprises:
suspending acceptance by the media management component of access-management-component traffic from the access management component.

10. The system of claim 1, wherein:
the media management component comprises:
a control path that comprises control-path memory and one or more resettable registers; and
a data path that comprises a data buffer; and
resetting the media management component comprises:
clearing the control-path memory;
clearing the one or more resettable registers; and
clearing the data buffer.

11. The system of claim 1, the operations further comprising:
after suspending operation of the access management component and prior to resuming operation of the access management component, determining whether there are any pending commands in the access management component, and if so then:
resetting a state of each pending command in the access management component; and
restarting each pending command in the access management component.

12. The system of claim 11, wherein restarting each pending command in the access management component comprises:
restarting a plurality of pending commands in the access management component in an original order.

13. The system of claim 11, the operations further comprising:
reordering a plurality of pending commands in the access management component into a revised order,
wherein restarting each pending command in the access management component comprises:
restarting the plurality of pending commands in the access management component in the revised order.

14. A method comprising:
responsive to detecting a triggering event for restarting a media management component performing operations comprising:
suspending operation of an access management component;
determining whether the media management component is operating, and if so then suspending operation of the media management component;
resetting the media management component;
resuming operation of the media management component; and
resuming operation of the access management component.

15. The method of claim 14, wherein the triggering event comprises receipt of a notification from the media management component.

16. The method of claim 14, wherein suspending operation of the access management component comprises:
suspending acceptance by the access management component of host-interface traffic from the host interface.

17. The method of claim 14, wherein suspending operation of the media management component comprises:
suspending acceptance by the media management component of access-management-component traffic from the access management component.

18. The method of claim 14, wherein:
the media management component comprises:
a control path that comprises control-path memory and one or more resettable registers; and
a data path that comprises a data buffer; and resetting the media management component comprises:
  clearing the control-path memory;
  clearing the one or more resettable registers; and
  clearing the data buffer.

19. The method of claim 14, further comprising:
after suspending operation of the access management component and prior to resuming operation of the access management component, determining whether there are any pending commands in the access management component, and if so then:
  resetting a state of each pending command in the access management component; and
  restarting each pending command in the access management component.

20. A non-transitory machine-readable storage medium containing instructions that, when executed by a processing device, cause the processing device to perform operations comprising:
  responsive to detecting a triggering event for restarting a media management component, performing operations comprising:
    suspending operation of an access management component;
    determining whether the media management component is operating, and if so then suspending operation of the media management component;
    resetting the media management component;
    resuming operation of the media management component; and
    resuming operation of the access management component.

* * * * *